United States Patent

[11] 3,582,770

| [72] | Inventor | Donald L. Hammond<br>Saw Kill, N.Y. |
|---|---|---|
| [21] | Appl. No. | 838,751 |
| [22] | Filed | July 3, 1969 |
| [45] | Patented | June 1, 1971 |
| [73] | Assignee | Ferroxcube Corporation<br>Saugerties, N.Y. |

[54] DEVICE FOR MEASURING MAGNETOSTRICTION IN A PLATED WIRE WITH MEANS FOR ADJUSTABLY SETTING A PREDETERMINED STRESS IN THE WIRE
4 Claims, 3 Drawing Figs.

| [52] | U.S. Cl. | 324/34, 63/133 |
|---|---|---|
| [51] | Int. Cl. | G01r 33/00 |
| [50] | Field of Search | 324/34, 34 Stress, 34 Magnots; 73/133 B |

[56] References Cited
UNITED STATES PATENTS

| 1,760,003 | 5/1930 | Amsler | 73/99 |
|---|---|---|---|
| 2,511,178 | 6/1950 | Roters | 73/136 |
| 2,794,951 | 6/1957 | Broding et al. | 324/34 |

*Primary Examiner*—Alfred E. Smith
*Assistant Examiner*—R. J. Corcoran
*Attorney*—Frank R. Trifari

ABSTRACT: Stationary and rotatable chuck assemblies are mounted in a spaced apart relationship to each other and adapted to hold therebetween a plated wire specimen. A drive current is sent through the plated wire and a sensing coil is placed around the wire and will detect the magnetic induction and the changes thereof in response to movement of the rotatable chuck and attached plated wire.

PATENTED JUN 1 1971
3,582,770
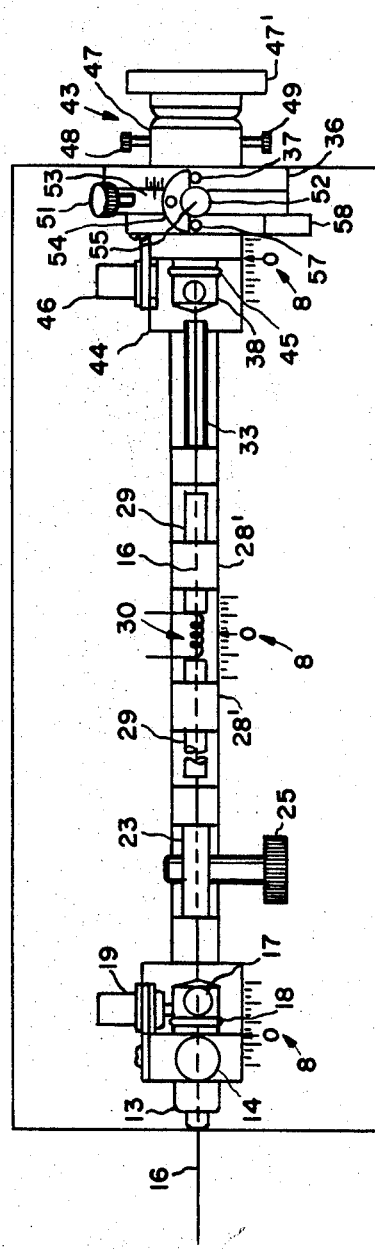
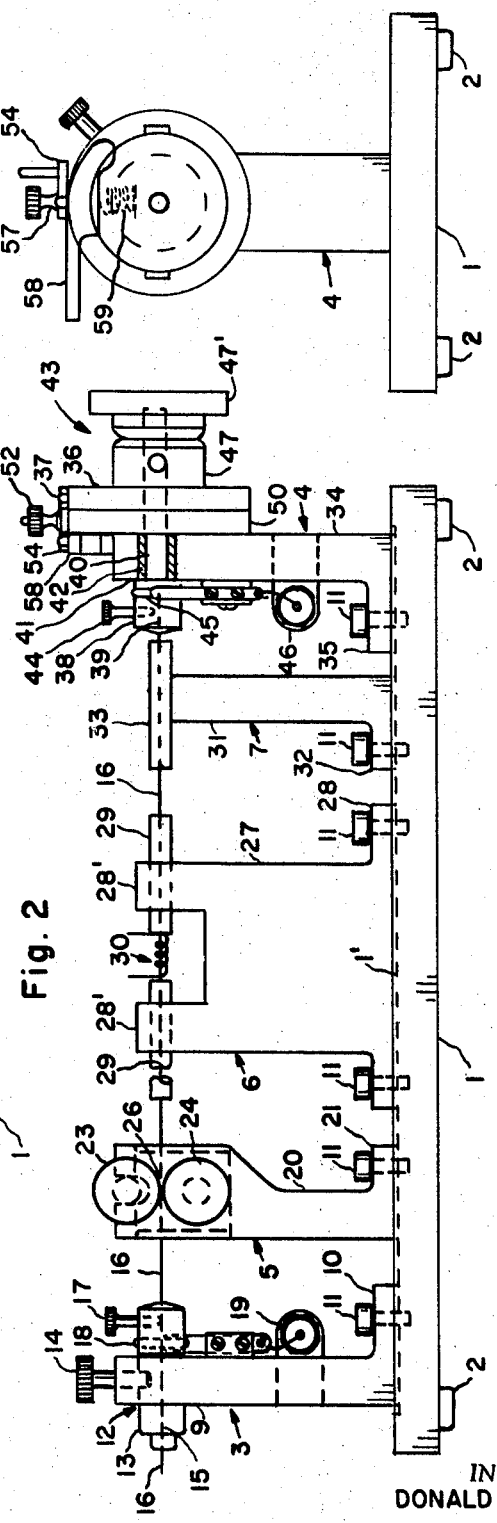
Fig. 1
Fig. 2
Fig. 3
INVENTOR.
DONALD L. HAMMOND
BY
*Frank R. Trifari*
AGENT

DEVICE FOR MEASURING MAGNETOSTRICTION IN A PLATED WIRE WITH MEANS FOR ADJUSTABLY SETTING A PREDETERMINED STRESS IN THE WIRE This invention relates to the field of testing devices and more particularly to those devices which are used to measure magnetostriction. Magnetostriction is the phenomena relating to the change in the linear dimensions of a ferromagnetic substance under magnetic influence and correspondingly the change of the magnetic properties when a substance is under mechanical stress.

The use of plated wire has been found to be of increasing importance in the fabrication of magnetic memory storage systems for computers. However, any mechanical deformation in the plated wire such as may be expected by thermal changes, twisting and handling, etc., will induce a strain in the plated wire and, due to magnetostriction may thereby adversely effect the memory properties of the plated wire.

Devices have heretofore been constructed for measuring magnetostriction or the change in the linear dimensions of specimens which are placed in magnetic fields and use a system of mechanical levers, mechanical-electrical levers, or optical magnification for detecting and measuring such changes.

The purpose of the present invention is to provide a device which will induce a mechanical stress in a specimen length of plated wire and will also detect and measure the resultant change in the magnetic properties of the wire. The device can also be used to determine the maximum amount of radial stress that a specimen length of plated wire can withstand prior to its failure. The magnetic properties and changes thereof in the plated wire are detected and measured by a sensing coil concentric with and placed around the plated wire. The coil is electrically connected to a meter which will display any magnetically induced current in the coil. It has been found that the difference in readings of this meter when taken prior to and after the wire has been stressed by the test device can be used as a "standard" by which to compare other test specimens. If the test specimen is initially under stress the difference between the initial reading and subsequent reading when additional stress is induced by the test device will be reflected when compared with the "standard" readings.

The invention encompasses an apparatus for accurately inducing a stress in a specimen length of plated wire. The wire is held by its ends in two chuck assemblies, one chuck assembly being stationary and the other chuck assembly being rotatably moved so as to induce a radial stress in a plated wire stretched between the two chucks. When a drive current is sent through the wire, a sensing-coil located around the wire and midway between the two ends of the wire will detect the magnetic-induction output of the plated wire and the changes in this output in relation to the amount of radial stress or movement of the rotatable chuck assembly. By comparing the differences in output readings for the specimen lengths of wire prior to and under stress it can be determined whether the wire had been previously under stress; the difference between the initial or reading at rest and the second reading or reading while under stress will indicate the sensitivity in terms of useable output of the wire to stress.

An object therefore of this invention is to provide a means to measure magnetostriction in a test specimen of plated wire.

Another object of this invention is to provide a movable chuck assembly which will permit accurate and repeatable stop positioning in either direction.

A further object of this invention is to provide a means to determine the maximum amount of radial stress which a specimen length of plated wire can take prior to failure.

The above and other objects features and advantages, of the present invention will be apparent when the following description of the preferred embodiments are considered in connection with the accompanying drawings wherein:

FIG. 1 shows a side elevational view of the magnetostriction test device with a plated wire test specimen in place.

FIG. 2 is an elevational view of the magnetostriction test device showing the unique dual direction stop assembly and the movable dial for presetting a desired amount of rotational force to be applied to plated wire test specimen.

FIG. 3 shows an end elevational view of the magnetostriction test device and rotatable chuck assembly.

The test device as shown in the figures consists of a baseplate 1, preferably made of a dielectric material which acts as an electrical insulation medium between the assemblies mounted thereon and can for example be made of three-fourths inch Plexiglass. The baseplate itself is shown as being supported on four rubber feet 2 which are placed at the corners. At the opposite ends on the baseplate are mounted, a stationary chuck assembly 3, and a movable or rotatable chuck assembly 4, between these two chuck assemblies and in alignment therewith are a wire transport device 5, a sensing device 6, and a wire support device 7. The two chuck assemblies and the related devices mentioned above are mounted in a manner which will permit their relative horizontal movement and adjustment with respect to the baseplate and to each other. This is accomplished by the positioning of same in a channel or groove 1', formed in a baseplate and by affixing same thereto with removable screws or bolts 11. This will permit the use of variable lengths of plated wire as the scribed reference marks 8, will serve as a calibration means for determining previous settings and for duplication of prior tests.

The stationary chuck assembly 3 mounted at one end of the baseplate is comprised of an upright member 9 preferably made of aluminum having a pedestal 10 which is fixed to the channel 1' in the base member 1 by means of screw 11. An aperture 12 at the upper end of the upright serves as a means for attaching the clamping member 13, preferably made of brass, to the upright. The lock screw 14 threaded through the upper end of the upright member and projecting into the aperture serves as a means for fixedly holding the clamping member 13 within the aperture. A transverse bore 15 passing longitudinally through the clamping member 13 serves as a means for feeding and positioning the plated wire 16 within the clamping member, and lock screw 17 when tightened, will clamp the plated wire against the bore and thus frictionally hold the wire in position. The chuck assembly being electrically insulated by the baseplate can be used as part of the electrical drive circuitry for one end of the plated wire being tested. Suitable electrical contact means such as gold-wire contact slip ring 18 soldered to the member 13 and attached to the terminal connector 19, provide the necessary connections for permitting the passage of a drive current through the plated wire.

The wire transport device 5 adjacent the chuck assembly 3 consists of an upright member 20 preferably made of aluminum, having a pedestal 21 fixed to the baseplate in a manner similar to that of the stationary chuck. A channel 22 formed in the upper end of the upright member 20 contains two rotatably mounted rubber rollers 23 and 24, the ends of the axis of the rollers being positioned in the walls of the upright member with one end of the axis of the lower roller 24 protruding beyond the channel wall and containing the operating knob 25 for manual movement of the roller 24. The two rollers are in sufficient frictional contact at point 26 such that a plated wire 16 placed therebetween will be moved by the rollers. The wire transport device thus prevents the wire from being damaged during loading and unloading of the magnetostriction test device and will eliminate the need to use human fingers or other means which might be harmful to the plated surfaces of the wire.

Adjacent the wire transport device 5 is the sensing device 6 which consists of a "Y"-shaped upright member 27 preferably made of aluminum, having a pedestal 28 and fixed to the baseplate in a manner as described hereinbefore. Each of the two arms 28 of the upright member contain a Teflon lined tunnel structure 29 through which the plated wire may easily be passed. A sensing coil 30 is positioned between the two arms 28 and completely surrounds the plated wire. The ends of the sensing coil are connected to two terminals from which wires lead to a current detecting and measuring instrument (not shown).

The wire support device 7, positioned adjacent the sensing device 6 consists of an upright member 31 preferably made of aluminum, having a pedestal 32 and is attached to the baseplate in a manner similar to that described for the previous devices. At the upper end of the upright member is a "V"-shaped supporting member or trough 33 preferably made from an ½×½×⅛ aluminum angle. The inner surface of the trough may be Teflon lined to reduce the frictional contact of the plated wire which will pass over and lightly lie within the trough. The supporting "V" is used to prevent the plated wire from drooping during the loading and unloading of the test device and will thus prevent damage to the plated wire.

The movable or rotatable chuck assembly 4, is positioned at the end of the baseplate, opposite from that end on which the stationary chuck assembly 3 is affixed, and consists of an upright member 34 preferably made of aluminum, having a pedestal 35 and same is secured to the baseplate in a manner similar to that previously described with respect to the other assemblies attached to the baseplate. This rotatably movable chuck has a calibrated dial 36 a double acting stop bar 54 and a stop pin 37 which permit accurate and repeatable stop positioning of the chuck when rotated in either a clockwise or counterclockwise direction. This will allow the inducement of a desired amount of radial force on the plated wire and also will insure that the exact duplication of this radial force is applied to each test specimen. It will also allow readings to be duplicated on the same test specimen for calibration purposes. A clamping member consisting of a cylindrical shaft member 38 preferably made of brass, having a longitudinal bore 39 at one end thereof which extends partially through the shaft, will accommodate the plated wire. The shaft has a neckeddown portion 40 which is journaled through the aperture 41 in the upper end of the upright member 34. The aperture may be provided with Oilite bearings 42, so as to facilitate the rotational movement of the shaft. The opposite end of the shaft is fixedly attached to a handle assembly 43. The plated wire is securely held within the bore 39 by means of locking screw 44 which is threaded to the shaft member 38 and extends into the bore so as to hold the plated wire in place within the bore. A gold wire contact slip ring 45 soldered to the shaft, and attached to the terminal connector 46, provide a means for supplying the drive current to the specimen plated wire. The chuck assembly 4 being electrically insulated by the baseplate can thus be used as part of the electrical drive circuitry for one end of the plated wire.

The handle assembly 43 has a dial portion 36, a projection therefrom or boss 47 and an operating handle 47'. The dial has indicia markings subdivided into degrees and fractions of degrees that are inscribed around the dial. Locking screws 48 and 49 which are threaded through the boss 47 will contact the shaft 38 and lock same to the handle assembly 43 so that movement of the handle will be transmitted to the shaft 38 and plated wire. Stop mounting member 50 is attached to the upright member 34 and has a locking screw 51 threaded therein which extends therethrough and contacts the shaft 38 to hold same in a fixed position during the presetting of the angular displacement of handle assembly 43, and will thus relieve pressure on the plated wire during this operation.

In order to preset the handle assembly 43, i.e. to set the desired amount of angular or rotational displacement, the locking screws 48 and 49 are loosened so as to permit the handle assembly to rotate freely without causing movement of the shaft 38. The shaft is also fixedly held in position by locking screw 51 as previously mentioned so as to relieve pressure on the plated wire. The desired angular displacement in either a clockwise or counterclockwise direction may be set using the dial 36 and index 53 on stationary member 50 as a guide. The locking screws 48 and 49 are then tightened and locking screw 51 is loosened to release the shaft 38. Rotation of the handle 47' will be transmitted to the plated wire. A double acting stop bar 54 pivotably mounted at 55 to the member 50 is positioned so as to contact the stop pin 56 protruding from the dial 36 when the handle 47 has been turned through the desired angular displacement. In order to eliminate the rotational movement of the double acting stop bar 54 upon contact with stop pin 56, lock screw 52 is used to fixedly position the stop bar, also a second stop pin 57 is attached on the opposite side of the stop bar. Pin 57 protrudes from lever 58, the lever being pivotally mounted at 58 on the upright member 34 and is held in its raised position by spring 59 (see FIG. 3). When the lever 58 is depressed against the spring action, the double acting stop bar will clear the top of pin 57 and can be rotated 180°. This will allow for calibration of the dial for a desired angular rotational displacement in an opposite direction.

The test device is operated in the following manner: first, the sensing coil 30 is connected to the electrical metering instruments for detecting and measuring the magnetic induction in the plated wire by means of interconnecting cables. Then, a precut length of plated wire is fed through the stationary assembly chuck 3 of the test device until it reaches the wire transport device 5, by operating knob 25 the rollers 23 and 24 can be rotated to feed the wire through the sensing device 6 and coil 30 over the "V" support 33 and into the rotatably moved chuck assembly 4. The wire is then clamped at both ends by locking screw 17 in the stationary chuck and by locking screw 44 in the movable chuck. A drive current is sent through the plated wire by means of terminals 19 and 46 and makes contact with the plated wire by means of the gold-wire slip rings 18 and 45. The magnetic induction output as a result of this drive current is detected and recorded by means of the sensing coil and metering instruments. The rotatable chuck is then rotated through the predetermined angular displacement (calibrated in the manner heretofore described) thereby inducing a radial force on the plated wire, and a second output reading is taken. The difference between these two readings can then be used to determine the magnetostrictive characteristics of the plated wire specimen under test. For example, it has been found that the reading taken under stress i.e. the second reading, will usually indicate a decrease in magnetic induction output; in other words, when a wire is under stress the magnetic induction output will be less than when the wire is initially unstressed and in its rest position. Once a "norm" or "standard" has been established a second wire can then be tested and compared with this "standard". It should be apparent that if the wire to be tested is initially stressed the difference between the two readings of its induction output will be less than if the wire is initially unstressed.

The test device can also be used to measure the correlation between the amount of radial stressing and the magnetic induction output, furthermore the test device can be used to measure the maximum amount of radial stress that the wire can take prior to failure.

The above cited embodiments are intended as exemplary only and while they have described the invention with a specific implementation and embodiment, other modifications thereof will be apparent to those skilled in the art.

I claim:

1. A device for detecting and measuring magnetostriction in a plated wire, comprising a baseplate, stationary chuck means attached to the baseplate at one end thereof, rotatable chuck means attached to the baseplate at another end thereof, both of said chuck means being adapted to hold opposite ends of a plated wire, means arranged on each of said chuck means for sending a drive current through the plated wire, coil means surrounding the plated wire and located between the two chuck means for detecting a change in magnetic induction output when the drive current is sent through the plated wire and the rotatable chuck is angularly displaced, said rotatable chuck means comprising a first upright member fixed to the baseplate, a shaft journaled through said first upright member, means for attaching one end of the plated wire specimen to the shaft, and means for rotating the shaft around its longitudinal axis through a specific and predetermined angular displacement comprising a handle assembly on one end of the shaft, a calibrated dial portion on said handle assembly, a stop pin on said dial portion, locking screws threaded through the handle assembly and securing the handle assembly to the shaft such that upon loosening of the locking screws the handle assembly may be rotated from its initial setting to the desired angular displacement without causing angular displacement of said shaft, and a stop bar supported by the first upright member for abutment against the stop pin after the handle has been secured to the shaft and rotated back to its initial setting so as to thereby cause a predetermined angular displacement of the shaft and wire specimen.

2. The device as claimed in claim 1 wherein the means for attaching one end of the plated wire specimen to the shaft comprises a longitudinal bore in the shaft for accommodating the end of the plated wire and a locking screw threaded through said shaft and projecting into the bore so as to clamp the plated wire in the bore.

3. The device as claimed in claim 1 further including a wire transport device attached to the baseplate and disposed between the two chuck means, the wire transport device comprising a second upright member and two rollers in frictional contact with each other and supported by the upright member, the wire being transported between the rollers at the point of contact.

4. The device as claimed in claim 3 further including a wire support device attached to the baseplate and disposed between the two chuck means, the wire support device comprising a third upright member and a "V"-shaped supporting member mounted on top of the upright member such that the plated wire may pass through and lightly lie within the "V"-shaped member.